Nov. 10, 1970 KOZO YAMAMOTO 3,538,779

MANUAL AND AUTOMATIC MAGNETIC HEAD MOVING MECHANISM
IN MAGNETIC RECORDING AND REPRODUCING
APPARATUS OF MOVABLE HEAD TYPE

Filed Aug. 28, 1967 5 Sheets-Sheet 1

INVENTOR

KOZO YAMAMOTO

BY Stevens, Davis, Miller & Mosher

ATTORNEYS

Nov. 10, 1970 KOZO YAMAMOTO 3,538,779

MANUAL AND AUTOMATIC MAGNETIC HEAD MOVING MECHANISM
IN MAGNETIC RECORDING AND REPRODUCING
APPARATUS OF MOVABLE HEAD TYPE

Filed Aug. 28, 1967 5 Sheets-Sheet 2

INVENTOR

KOZO YAMAMOTO

BY

ATTORNEYS

INVENTOR

KOZO YAMAMOTO

BY [signature]

ATTORNEYS

MANUAL AND AUTOMATIC MAGNETIC HEAD MOVING MECHANISM IN MAGNETIC RECORDING AND REPRODUCING APPARATUS OF MOVABLE HEAD TYPE

Filed Aug. 28, 1967 5 Sheets-Sheet 4

INVENTOR
KOZO YAMAMOTO

BY Stevens [illegible]

ATTORNEYS

Nov. 10, 1970 KOZO YAMAMOTO 3,538,779

MANUAL AND AUTOMATIC MAGNETIC HEAD MOVING MECHANISM
IN MAGNETIC RECORDING AND REPRODUCING
APPARATUS OF MOVABLE HEAD TYPE

Filed Aug. 28, 1967 5 Sheets-Sheet 5

INVENTOR
KOZO YAMAMOTO

BY Stevens, Davis, Miller & Mosher

ATTORNEYS 3,538,779

MANUAL AND AUTOMATIC MAGNETIC HEAD MOVING MECHANISM IN MAGNETIC RECORDING AND REPRODUCING APPARATUS OF MOVABLE HEAD TYPE

Kozo Yamamoto, Hirakata-shi, Japan, assignor to Matsushita Electric Industrial Co., Ltd., Osaka, Japan, a corporation of Japan Filed Aug. 28, 1967, Ser. No. 663,634
Claims priority, application Japan, Apr. 12, 1967, 42/31,301
Int. Cl. F16h 27/02; G11b 21/08
U.S. Cl. 74—128 4 Claims

ABSTRACT OF THE DISCLOSURE

A magnetic head moving mechanism in magnetic recording and reproducing apparatus of movable head type having a slidable actuating lever, a rocking lever pivoted to the actuating lever, an abutment member fixed to the rocking lever, a plunger lever pivoted to a base plate to engage the abutment member, and a shift lever associated with an energy accumulating spring and the plunger lever. In the mechanism, a constant rotating force is always imparted to a rotary cam for shifting the magnetic head, and the plunger lever is associated with a solenoid for common use in both the automatic and manual operations.

BACKGROUND OF THE INVENTION

Field of the invention

This invention relates to magnetic recording and reproducing apparatus, and more particularly to a magnetic head moving mechanism in a magnetic recording and reproducing apparatus of the movable head type for use in combination with a tape cartridge, in which a magnetic head is moved by a cam in a direction perpendicular with respect to the traveling direction of a multitrack magnetic recording tape so that the tracks engaged by the magnetic head can be successively changed over for a long-time recording and reproducing.

Description of the prior art

Magnetic recording and reproducing apparatus of the movable head type for use with a tape cartridge are known in the art. The known magnetic recording and reproducing apparatus of the type described has a basic structure comprising a mechanism for causing vertical swinging movement of a head arm mounting thereon a transducing head in a direction perpendicular with respect to the traveling direction of a tape by means of a cam of a discal or like shape, a mechanism for causing intermittent rotation of the cam in one direction through a predetermined angle at a time, and a track change-over control mechanism for effecting the desired change-over of the tracks on the tape. These mechanisms must always operate under a highly stable state with high precision.

More precisely, the mechanism for causing the vertical swinging movement of the head arm in the prior apparatus generally employs a hinge structure in which the head arm is swingably supported by a pin passed through a bore in the head arm. In view of the prior structure as described above, the playing movement of the head arm in its vertical as well as transverse direction due to the clearance in the hinge portion has been inevitable and such playing movement has frequently given rise to crosstalk and level fluctuation. Further, the above structure has ben susceptible to wear at the hinge portion which results in lowered performance of the apparatus.

The tape travels past the transducing head by being limited in its vertical movement by means of a tape limiter. Since in this case the tolerance in the tape having a width of 6.25 mm. is ±0.05 mm., the minimum dimension of the width of the tape receiving slot in the tape limiter must be 6.30 mm., and thus a slot width of $$6.30^{+0.05}_{-0}\text{ mm.}$$

is required when the tolerance for the machining is taken into consideration. Because of the above fact, a maximum vertical clearance of 0.15 mm. exists between the tape and the tape receiving slot in the tape limiter and thus the tape having passed through the tape limiter travels past the transducing head while making a vertical movement of 0.15 mm. relative to the transducing head. The above movement of the tape provides a serious problem in respect of the occurrence of crosstalk and level fluctuation especially in the apparatus employing a tape 6.25 mm. wide having thereon eight tracks.

In the prior apparatus, the cam for directly causing the vertical swinging movement of the transducing head must always make an equiangular rotating movement. The mechanism priorly employed for the above purpose has comprised a ratchet mounted on the cam in integral relation therewith and a pawl for causing intermittent rotation of the ratchet, hence the cam by its reciprocating movement. Since, with such a structure, any variation in the load on the cam or in the moving speed of the pawl tends to cause overrun of the ratchet, hence the cam beyond the predetermined stopping position and thus gives rise to crosstalk and level fluctuation. In order to avoid such troubles, an overrun stopper is provided in some of the existing sets. However, the provision of such overrun stopper has not exhibited a satisfactory effect because the stopper is not constructed integrally with the cam driving pawl and it is difficult to attain registration in their mounting positions.

Further, the manual change-over of channels has heretofore resorted to an electrical method in which a switch is actuated to cause attraction of a plunger of a solenoid. The above manner of channel change-over has been uneconomical in respect of current consumption especially in a set primarily designed for mounting on vehicles or for use with batteries, and has frequently given rise to detrimental trouble of plunger burn when a change-over button is left in its depressed state to thereby allow continuous supply of current to the solenoid.

SUMMARY OF THE INVENTION

It is an object of the present invention to provide a novel and effective mechanism for causing the step-by-step movement of a magnetic transducing head in a magnetic recording and reproducing apparatus by manual actuation of an actuating lever, in which the rotary movement of means such as a cam through a predetermined angle for causing the above movement of the magnetic head is positively and accurately effected regardless of the speed of actuation of the actuating lever.

Another object of the present invention is to provide a useful mechanism for automatically moving the magnetic head by reciprocating movement of a plunger of a solenoid or for manually moving the magnetic head by manual actuation of an actuating lever, in which the adjustment of the relative position of means operatively associated with a pivotal lever which is driven by the actuating lever through said means can be easily attained and the attractive force of the plunger by the solenoid can be effectively imparted to the pivotal lever.

A further object of the present invention is to provide a magnetic head moving mechanism in a magnetic recording and reproducing apparatus having an engaging means of very simple structure which can make positive and stable operation in moving the magnetic head and can be simply adjusted to suit the operational demand.

These and other objects, advantages and features of the present invention will become apparent from the following description of a preferred embodiment with reference to the accompanying drawings.

BRIEF DESCRIPTION OF THE DRAWINGS

Throughout the drawings, like reference numerals are used to denote like parts.

DESCRIPTION OF THE PREFERRED EMBODIMENT

The present invention illustrated in FIGS. 1 to 9 provides effective means for eliminating the possibility of crosstalk, level fluctuation, reducing the current consumption and protecting the solenoid against possible burn in the multitrack recording and reproducing apparatus of the movable head type described above.

Figure 1:
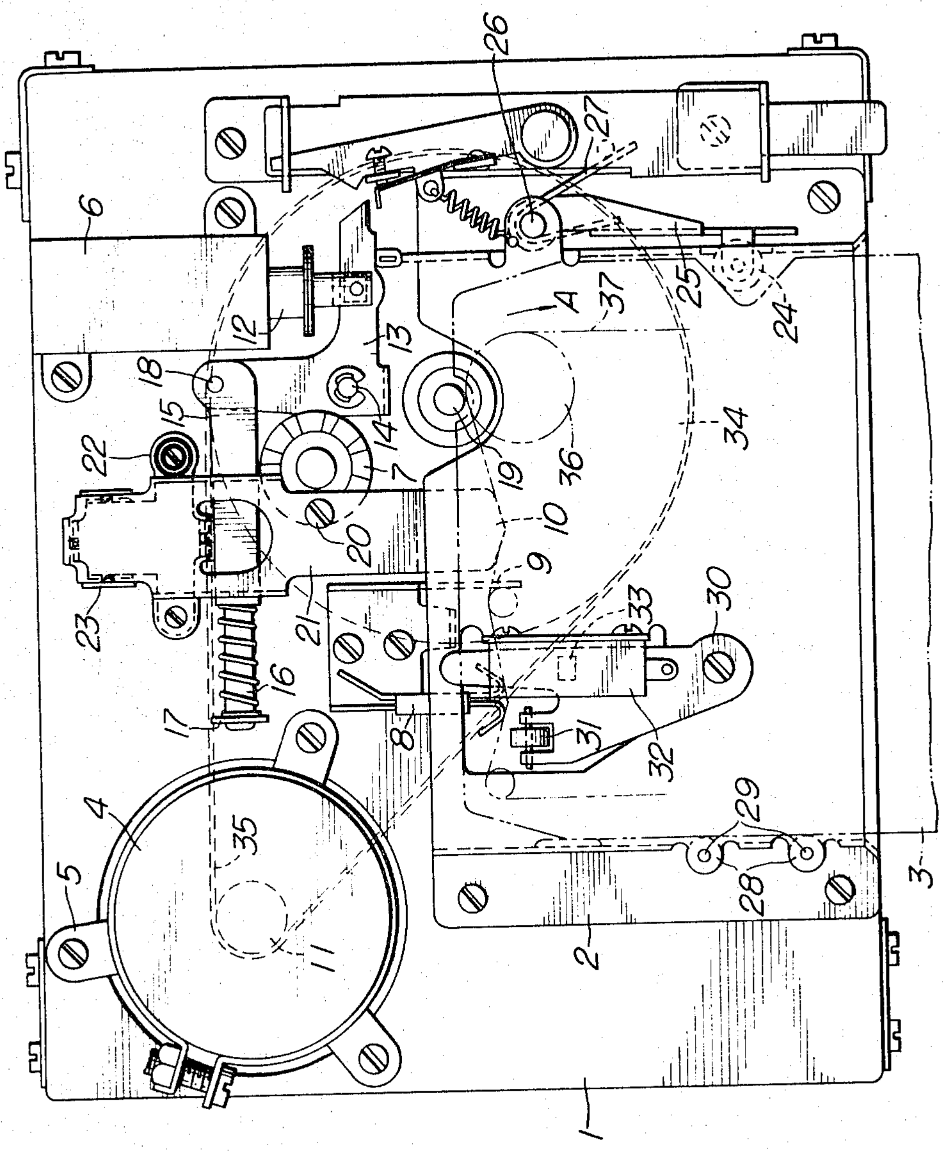
FIG. 1 is a top plan view of a magnetic recording and reproducing apparatus of the movable head type equipped with a magnetic head moving mechanism according to the invention.
Figure 2:
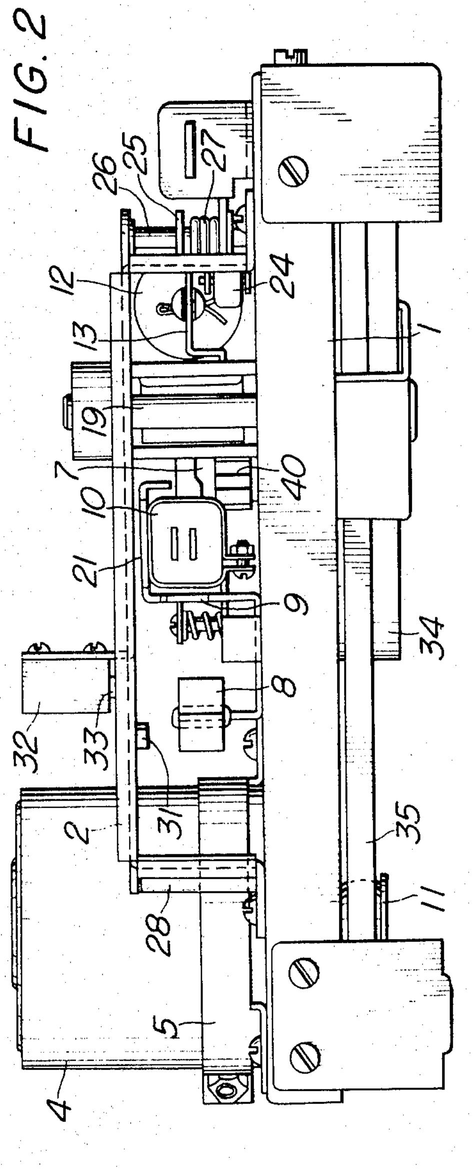
FIG. 2 is an elevational view of the apparatus shown in FIG. 1.
Figure 3:
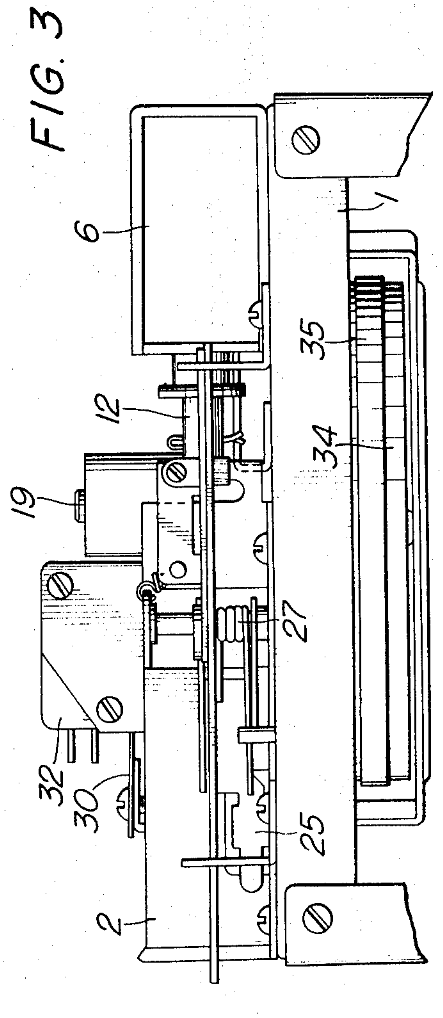
FIG. 3 is a side elevational view when looked from the right-hand side of the apparatus shown in FIG. 1.

Referring first to FIGS. 1, 2 and 3, the general structure of the magnetic recording and reproducing apparatus according to the present invention will be described. The magnetic recording and reproducing apparatus includes a base plate 1 on which a cartridge guide 2 is securely fixed. The cartridge guide 2 is provided at its side with a plurality of guide roller pins 29 on which guide rollers 28 are rotatably mounted. A microswitch 32 for switching on and off the power supply and a holding-down spring 30 having a holding-down roller 31 are mounted on the upper face of the cartridge guide 2. A motor 4 is secured to the base plate 1 by a motor mounting member 5, and has a pulley 11 mounted on the motor shaft extending downwardly through the wall of the base plate 1. A driving belt 35 is passed about the motor pulley 11 and a flywheel 34 having a capstan 19 centrally thereof. A tape limiter 9 is provided to limit the vertical movement of a magnetic tape 37, and a contact arm 8 is provided to sense a foil of conductive material bonded to the magnetic tape 37. A transducing head 10 is fixedly mounted on a head arm 21 which is provided with a height adjusting screw 20 engaging a discal track change-over cam 7 having a plurality of track change-over lands of different heights. The head arm 21 is mounted for free azimuth adjustment and vertical swinging movement on the base plate 1 by means of an arm mounting member 23 and an arm support 22.

A cartridge 3 having therein an endless magnetic tape 37 wound in a multiplicity of superposed layers about an axis is inserted in the cartridge guide 2 through the front opening of the latter and is secured in place by a locking roller 24 mounted on a locking arm 25 which can make pivotal movement about a pivot pin 26. The locking arm 25 is normally urged to its cartridge locking position by a locking spring 27. A solenoid 6 which is energized in response to electrical contact between the contact arm 8 and the conductive foil on the magnetic tape 37 has its plunger 12 extending forwardly for being operatively connected with a plunger lever 13 which makes pivotal movement about a pivot pin 14. A shift lever 15 having a compression spring 16 mounted on one end thereof is operatively connected at the other end thereof with the plunger lever 13 by a pin 18.

Referring then to FIGS. 4 to 8, the magnetic head moving mechanism according to the invention will be described in detail. The plunger lever 13 forming part of the magnetic head moving mechanism is substantially L-shaped and is pivotally mounted at its bent portion on the base plate 1 by the pivot pin 14. The plunger lever 13 has one end or a free end 73 thereof shaped to the form of a wedge having a sloped edge. The shift lever 15 is pivotally connected at one end thereof to the other end of the plunger lever 13 by the pin 18 and has the other end thereof made narrower in width to provide a stepped portion 70. The outer end of the stepped portion 70 is slidably inserted in a guide 17 securely fixed to the base plate 1, and the compression spring 16 coiled about the stepped portion 70 bears against the guide 17 at one end thereof and against the shoulder of the stepped portion 70 at the other end thereof.

A leaf spring 71 is fixed at one end thereof to a substantially middle portion of the shift lever 15 and has at the other end thereof a changeover finger 39 and a stopper finger 38 normally resiliently engaging with teeth *a* and *b*, and a tooth *c*, respectively, of a ratchet 40 which is rotatably mounted on the base plate 1 by a shaft 72. When the shift lever 15 is urged toward the guide 17 against the resiliency of the compression spring 16, the leaf spring 71 is disengaged from its engaging position with the teeth *a*, *b* and *c* of the ratchet 40 so that the change-over finger 39 and the stopper finger 38 move away from the teeth of the ratchet 40. Then when the shift lever 15 is restored to its original position, the change-over finger 39 and the stopper finger 38 of the leaf spring 71 are now engaged with the teeth *b* and *c*, and a tooth *d*, respectively, of the ratchet 40 to cause clockwise rotation of the ratchet 40 through a predetermined angle.

An actuating lever 49 is slidably supported in support members 50 and 51 fixed to the base plate 1 and has an actuating portion at one or front end thereof. A rocking lever 55 is swingably mounted at one end thereof on a substantially middle portion of the actuating lever 49 by a pivot pin 52, while the other end of the rocking lever 55 and the other end of the actuating lever 49 are sildably received in a slot 58 (FIG. 7) provided in the support member 51.

That face of the other or free end of the rocking lever 55 facing the shift lever 15 is shaped to the form of a sloped face 59 which projects toward the plunger lever 13. An abutment member 54 of resilient material such as spring steel has one end thereof fixed to the rocking lever 55 by a rivet 53 and has the other or free end thereof suitably bent so that said end can engage the back face portion of the wedge-shaped end 73 of the plunger lever 13 when the actuating lever 49 is actuated or advanced. A screw 56 in threaded engagement with a lug 74 on the rocking lever 55 may be suitably manipulated to bias the free or bent end of the abutment member 54 toward the plunger lever 13 so as to adjust the engaging position of the abutment member 54 relative to the plunger lever 13. By gripping or placing the finger on the actuating end portion of the actuating lever 49 and advancing the lever 49 toward the support member 51, the abutment member 54 can engage the plunger lever 13 and cause a pivotal movement of the plunger lever 13 is a counter-clockwise direction about the pin 14. A spring 57 anchored to the rocking lever 55 and to the cartridge guide 2 provided on the base plate 1 acts to normally urge the rocking lever 55 toward the plunger lever 13.

The solenoid 6 is fixedly mounted on the base plate 1, and the plunger 12 having an attraction reinforcing ring 75 thereon protrudes from the solenoid 6 toward the plunger lever 13. A pin 76 is fitted adjacent to the front end of the plunger 12 at a position spaced from the attraction reinforcing ring 75 and is loosely received in a hole 77 bored substantially centrally of that side of the plunger lever 13 having the wedge-shaped end 73. By the engagement between the pin 76 and the hole 77, the counter-clockwise pivotal movement of the plunger lever 13 can take place when the plunger 12 is attracted into the solenoid 6. The relation between the pin 76 on the plunger 12 and the hole 77 formed in the plunger lever 13 is such that the hole 77 has a width at least 1.3 times the diameter of the pin 76 in the direction of attraction of the plunger 12.

The magnetic head moving mechanism according to the invention operates in a manner as described below. Referring to FIGS. 1, 2 and 3, when the cartridge 3 is inserted into the cartridge guide 2 as shown, the cartridge 3 is locked in the predetermined position by the locking roller 24, and the holding-down roller 31 shown in FIG. 2 is urged upwardly. By the upward movement of the holding-down roller 31, the holding-down spring 30 shown in FIG. 3 depresses a movable lug 33 into the microswitch 32 to turn on the power supply to thereby start the motor 4. A magnetic tape 37 fitted in the cartridge 3 is forced by a pinch roller 36 against the rotating capstan 19 so that the magnetic tape 37 is driven in a direction shown by an arrow A.

Figures 4, 5:
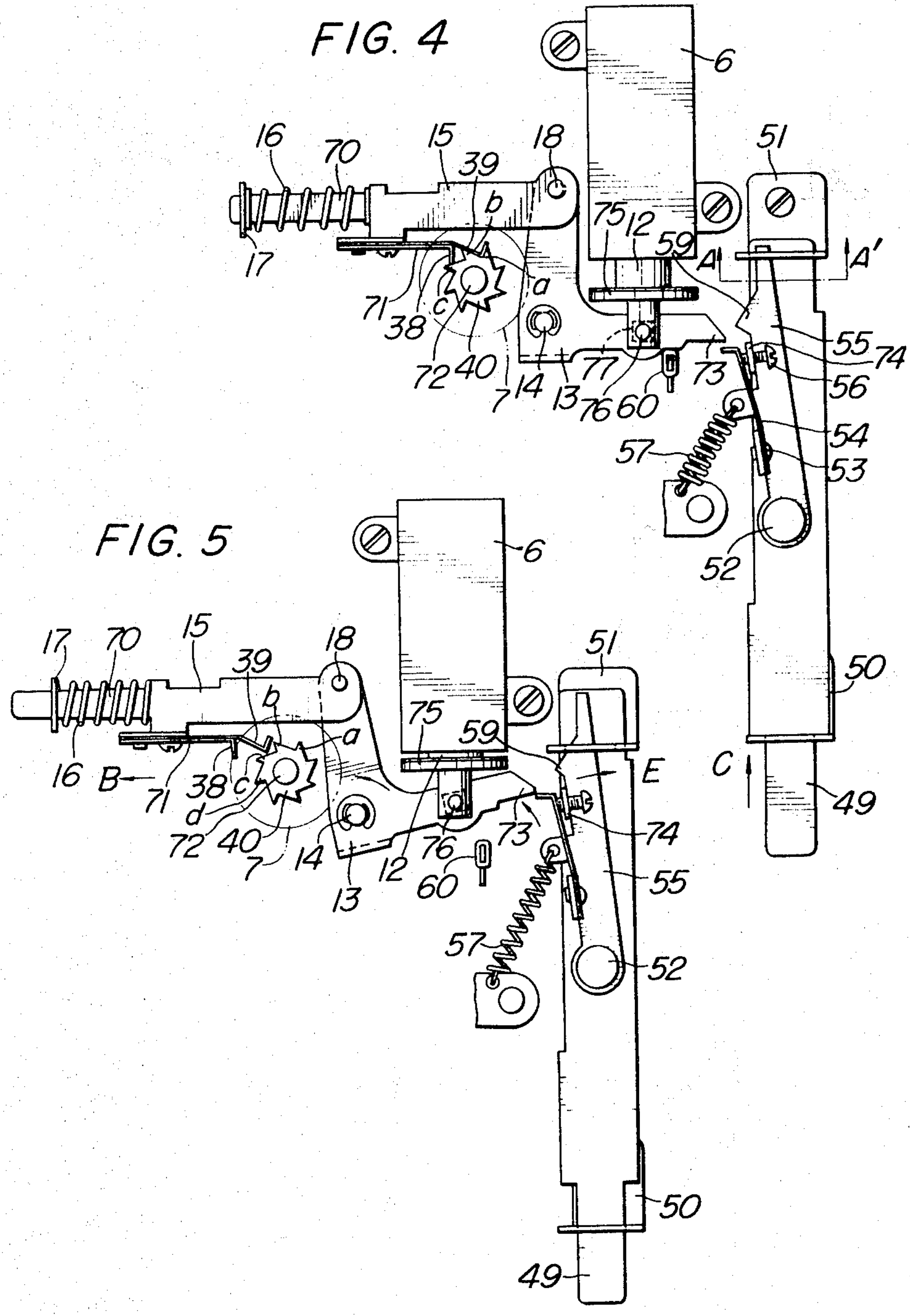
FIG. 4 is a plan view of the magnetic head moving mechanism according to the invention with the mechanism shown in its nonoperative state.
FIG. 5 is a view similar to FIG. 4 but showing the mechanism in its partly actuated state.

When, in the above state, the conductive foil bonded or otherwise fixed to the magnetic tape 37 finally moves to contact the contact arm 8, the circuit including the solenoid 6 is completed to energize the solenoid 6. As a result, the plunger 12 is attracted inwardly into the solenoid 6 and causes a counter-clockwise pivotal movement of the plunger lever 13 with the pin 76 on the plunger 12 engaging that edge of the hole 77 of the plunger lever 13 which lies on the side of the solenoid 6. The counter-clockwise pivotal movement of the plunger lever 13 urges the shift lever 15 in a direction as shown by an arrow B while compressing the compression spring 16. This state is best shown in FIG. 5. During the above movement of the shift lever 15 also moves away from the ratchet 40 with its change-over finger 39 disengaged from the teeth *a* and *b* of the ratchet 40 and with its stopper finger 38 disengaged from the tooth *c* of the ratchet 40.

Figures 6, 7:
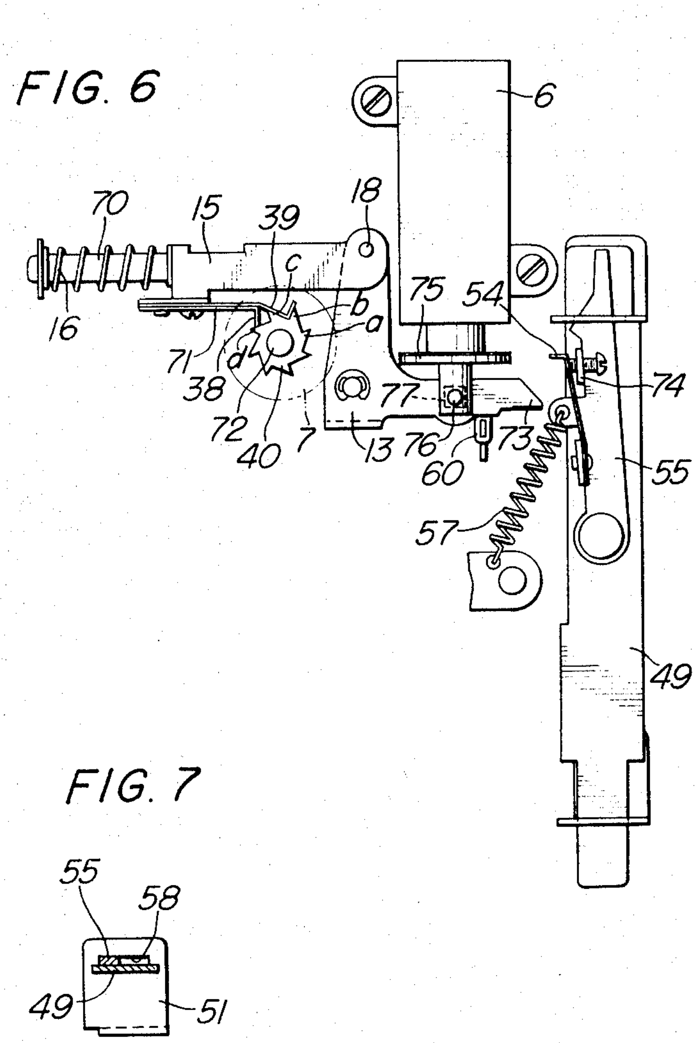
FIG. 6 is a view similar to FIG. 4 but showing the mechanism in its completely actuated state.
FIG. 7 is a sectional view taken on the line A–A' in FIG. 4.

Further travel of the magnetic tape 37 disconnects the electrical contact between its conductive foil and the contact arm 8 so that the curent flowing through the solenoid 6 is cut off. In response to deenergization of the solenoid 6, the compression spring 16 is resiliently restored to take its original shape to restore the shift lever 15 and the plunger lever 13 connected thereto to their original positions. The leaf spring 71 moving with the shift lever 15 rotates the ratchet 40 clockwise through an arc corresponding to one tooth exactly as shown in FIG. 6, and the action of the cam 7 which is mounted for synchronous operation with the ratchet 40 causes a vertical swinging movement of the head arm 21 together with the arm support 22 about the opposite mounting member 23 so that the magnetic head 10 is vertically moved or shifted one step. From the foregoing description, it will be understood that the magnetic head 10 can be automatically shifted by the action of the solenoid 6 according to the above operating sequence.

Figure 8:
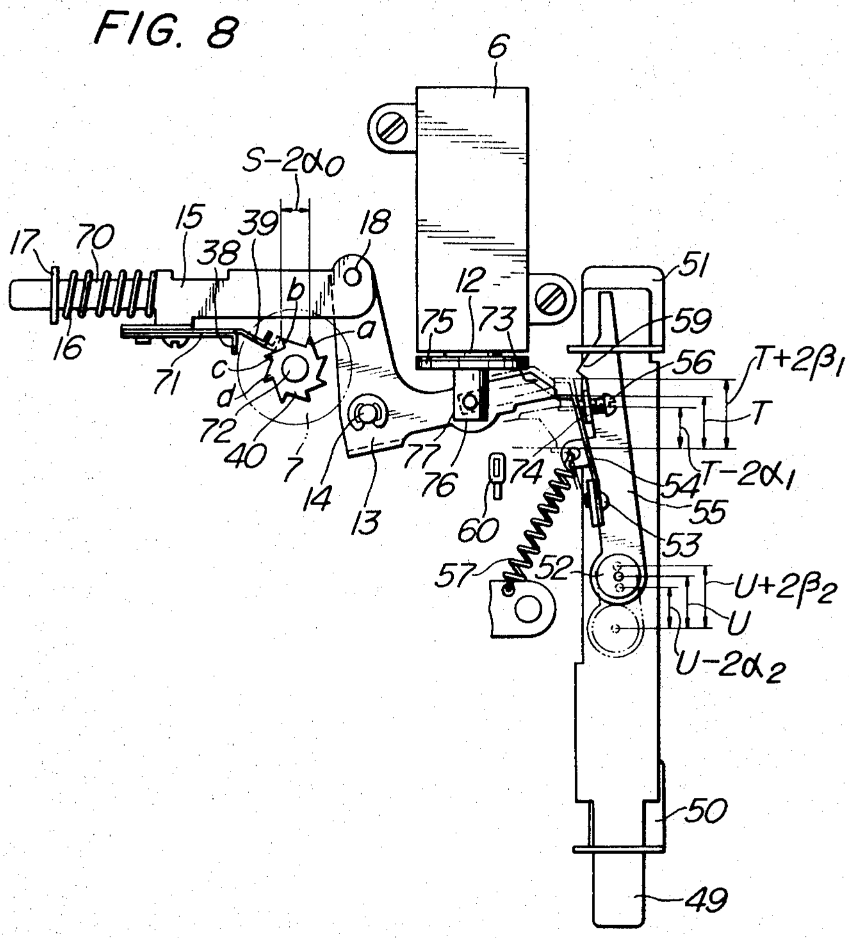
FIG. 8 is a plan view showing the operating sequence of the magnetic head moving mechanism according to the invention.

The manual change-over or shifting of the head position by means of the actuating lever 49 will next be described. In the manual shifting operation, the actuating lever 49 in its nonoperative position as shown in FIG. 4 may be gripped by hand at its actuating portion or may be urged by the finger so that it may be moved in a direction shown by an arrow C together with the rocking lever 55 against the resiliency of the return spring 57. As the actuating lever 49 is advanced, the free end of the abutment member 54 adjustably fixed to the rocking lever 55 engages and forces the back face portion of the sloped face at the free end 73 of the plunger lever 13. As the actuating lever 49 is further advanced, the abutment member 54 causes the plunger lever 13 to rotate counter-clockwise as shown in FIG. 5 or 8. With the advancing movement of the rocking lever 55 together with the actuating lever 49, the rocking lever 55 whose free end is guided by the slot 58 in the support member 51 is caused to swing clockwise in a direction shown by an arrow E due to the fact that the sloped portion 59 is formed adjacent to the free end of the rocking lever 55. Further, the counter-clockwise pivotal movement of the plunger lever 13 urges the shift lever 15 toward the guide 17 while compressing the compression spring 16, and the above movement of the shift lever 15 results in disengagement of the teeth *a* and *b* of the ratchet 40 from the change-over finger 39 of the leaf spring 71 and disengagement of the tooth *c* of the ratchet 40 from the stopper finger 38 of the leaf spring 71.

As the actuating lever 49 is further advanced, the engagement between the free end of the abutment member 54 and the free end 73 of the plunger lever 13 is released as shown in FIG. 6 due to the fact that the rocking lever 55 is further swung in the direction E or in the clockwise direction by engagement between the sloped portion 59 thereof with the side wall of the slot 58 in the support member 51 as shown in FIG. 7 and due also to the fact that the plunger lever 13 makes further pivotal movement in the counterclockwise direction. Due to the absence of any engagement between the free end of the abutment member 54 and the free end 73 of the plunger lever 13, the plunger lever 13 is quickly rotated clockwise by the spring-back action of the compression spring 16 to be restored to its original position, and the change-over finger 39 and the stopper finger 38 of the leaf spring 71 are urged to engage with the teeth *b* and *c*, and the tooth *d*, respectively, of the ratchet 40 to rotate the ratchet 40 clockwise to thereby cause vertical one-step shifting of the magnetic head 10.

After the engagement between the free end of the abutment member 54 on the rocking lever 55 and the free end 73 of the plunger lever 13 has been quickly released as described above and the plunger lever 13 has been restored to its original position, the actuating pressure of the actuating lever 49 may be released to cause automatic return of the actuating lever 49 to its original position by the resilient returning force of the return spring 57 imparted to the actuating lever 49 through the rocking lever 55. During the return movement of the actuating lever 49, the abutment member 54 on the rocking lever 55 is restored to its original position while making a slight clockwise swinging movement with its free end slidingly moving along the sloped face of the free end 73 of the plunger lever 13. The above operation is repeated to shift the magnetic head 10 through another step when the actuating lever 49 is again urged in the direction of the arrow C.

It will be readily understood that the automatic operation described previously can be effected without in any way interfering with the mechanism provided for the manual operation since, in the automatic operation, the plunger 12 of the solenoid 6 is urged in the direction to move away from the abutment member 54 mounted on the rocking lever 55. In the return movement of the plunger lever 13, the pin 76 on the plunger 12 is engaged and urged by that edge of the hole 77 of the plunger lever 13 which lies on the side adjacent to the solenoid 6, and the plunger 12 engaging with its pin 76 with the above edge of the hole 77 of the plunger lever 13 is urged away from the solenoid 6 to be restored to its original position.

The pin 76 in the prior art apparatus has been disposed at a position spaced a certain fixed distance from the attraction reinforcing ring 75 and tightly engaged with the hole of the plunger lever 13 without any movable clearance in the axial direction of the plunger 12. In contrast to the prior art arrangement as described above, the relation between the pin 76 and the hole 77 in the present invention is such that the hole 77 in the plunger lever 13 has a width which is at least 1.3 times the diameter of the pin 76 in the axial direction of the plunger 12.

Suppose now that the change-over finger 39 and the stopper finger 38 of the leaf spring 71 are disengaged from the teeth *a* and *b*, and the tooth *c*, respectively, of the ratchet 40 when the leaf spring 71 moves a distance of $S-2\alpha_0$, the abutment member 54 and the actuating lever 49 must move respective distances of $T-2\alpha_1$ and $U-2\alpha_2$ in order to cause the movement of the leaf spring 71 through the above distance. Then, the leaf spring 71 may be arranged to be capable of moving a distance of at least $S-2\alpha_0$ in order that its change-over finger 39 and stopper finger 38 can engage the teeth *b* and *c*, and the tooth *d*, respectively, of the ratchet 40 to cause rotation of the ratchet 40. It is supposed herein that the engagement between the abutment member 54 and the plunger lever 13 is about to be released when the actuating lever 49 moves a distance U and therefore the free end of the abutment member 54 moves a distance T. In the above situation, the plunger lever 13 is capable of further moving to a position at which the free end of the abutment member 54 moves a distance of $T+2\beta_1$ corresponding to a moved distance $U+2\beta_2$ of the actuating lever 49. Therefore, the position of the screw 56 may be suitably adjusted so that the abutment member 54 can be disengaged from the plunger lever 13 while the actuating lever 49 moves a distance of $2\beta_2+2\alpha_2$ in the direction of the arrow C. The above fact means that the adjustable range in the invention is wider by an amount of $2\beta_2$ than in the prior device of this kind. In an actual test made by the inventor, it was found that the width of the hole 77 in the axial direction of the plunger 12 must be at least 1.3 times the diameter of the pin 76 in order to provide the above adjustable range in the actual product.

It will be appreciated that the widened range of adjustment of the disengaging position of the abutment member 54 from the plunger lever 13 permits considerably low dimensional precision of the component parts which can therefore be manufactured simply at low cost, and the service life of the mechanism can be remarkably extended since it is less affected by the wear of the free end 73 of the plunger lever 13. In the mechanism according to the invention during its automatic operation for shifting the magnetic head 10 by the action of the solenoid 6, the plunger 12 is placed in its no-load state while the pin 76 moves through the freely movable space in the hole 77 until it is abutted by the edge of the hole 77, and since the plunger 12 has a certain acceleration $\alpha$ before the pin 76 rotates the plunger lever 13, the pin 76 strikes against the inner wall of the hole 77 with a striking energy $F=m\alpha$ (where $m$ is the mass of the plunger 12) which is added to the normal attraction force of the plunger 12. It will thus be appreciated that the effective utilization of the attraction force of the plunger 12 is advantageous in that a solenoid of smaller capacity than heretofore can sufficiently have attained the desired operation and the mechanism can be made to a smaller size.

I claim:

1. A magnetic head moving mechanism in a magnetic recording and reproducing apparatus of the movable head type comprising an actuating lever disposed for sliding movement, a rocking lever pivoted at one end thereof to said actuating lever and having a resilient abutment member mounted thereon, a spring means for normally urging said rocking lever in a predetermined direction, a pivotal lever mounted on a base plate for pivotal movement about a pivot point, said pivotal lever being disposed in such a manner that one end thereof engages for a predetermined period with said abutment member when said abutment member is advanced by the sliding movement of said actuating lever, a shift lever operatively connected to the other end of said pivotal lever and having thereon a compression spring means which, when compressed, accumulates the energy transmitted thereto through said pivotal lever and releases the accumulated energy in its resilient return movement, and a cam means disposed for rotation through a predetermined angle in response to the resilient return movement of said compression spring means to thereby shift the magnetic head to the desired position.

2. A magnetic head moving mechanism in a magnetic recording and reproducing apparatus of the movable head type according to claim 1, in which a sloped portion is formed adjacent to the free end of said rocking lever so that said pivotal lever can be disengaged from said resilient abutment member after the engagement therebetween for the predetermined period.

3. A magnetic head moving mechanism in a magnetic recording and reproducing apparatus of the movable head type according to claim 1, in which means is provided on said rocking lever in order to adjust the engaging state between said resilient abutment member and said pivotal lever.

4. A magnetic head moving mechanism in a magnetic recording and reproducing apparatus of the movable head type comprising an actuating lever disposed for sliding movement, a rocking lever pivoted at one end thereof to said actuating lever and having a resilient abutment member adjustably mounted thereon, a spring means for normally urging said rocking lever in a predetermined direction, a pivotal lever mounted on a base plate for pivotal movement about a pivot point, said pivotal lever being disposed in such a manner that one end thereof engages for a predetermined period with said abutment member when said abutment member is advanced by the sliding movement of said actuating lever, a solenoid associated with a plunger which is movable into and out of said solenoid, said plunger being coupled to said pivotal lever by a pin on said plunger and a hole disposed adjacent to said one end of said pivotal lever, said hole having such a dimension that the width of said hole in the moving direction of said pin is at least 1.3 times the diameter of said pin, a shift lever operatively connected to the other end of said pivotal lever and having thereon a compression spring means which, when compressed by the manual sliding movement of said actuating lever or by the automatic attraction of said plunger into said solenoid, accumulates the energy transmitted thereto through said pivotal lever and releases the accumulated energy in its resilient return movement, and a cam means disposed for rotation through a predetermined angle in response to the resilient return movement of said compression spring means to thereby shift the magnetic head to the desired position.

References Cited

UNITED STATES PATENTS

| | | | |
|---|---|---|---|
| 3,056,302 | 10/1962 | Proctor | 179—100.2 |
| 3,455,559 | 7/1969 | Wilson | 179—100.2 |

BERNARD KONICK, Primary Examiner

R. S. TUPPER, Assistant Examiner

U.S. Cl. X.R.

74—142; 179—100.2; 274—4